United States Patent
Zhang et al.

(10) Patent No.: US 12,172,680 B2
(45) Date of Patent: Dec. 24, 2024

(54) MAGLEV VEHICLE AND SUSPENSION FRAME ASSEMBLY THEREOF

(71) Applicant: CRRC TANGSHAN CO., LTD., Hebei (CN)

(72) Inventors: Shuo Zhang, Tangshan (CN); Liangjie Li, Tangshan (CN); Jianfeng Li, Tangshan (CN); Xiuyu Sun, Tangshan (CN); Ruizhen Dai, Tangshan (CN); Ruimei Wu, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 941 days.

(21) Appl. No.: 17/281,225

(22) PCT Filed: Nov. 1, 2018

(86) PCT No.: PCT/CN2018/113493
§ 371 (c)(1),
(2) Date: Mar. 29, 2021

(87) PCT Pub. No.: WO2020/062429
PCT Pub. Date: Apr. 2, 2020

(65) Prior Publication Data
US 2021/0394801 A1    Dec. 23, 2021

(30) Foreign Application Priority Data
Sep. 30, 2018    (CN) ............................ 201811157992

(51) Int. Cl.
*B61B 13/08*    (2006.01)
*B60L 13/04*    (2006.01)
(Continued)

(52) U.S. Cl.
CPC .............. *B61B 13/08* (2013.01); *B60L 13/04* (2013.01); *B60L 13/08* (2013.01); *B61F 5/144* (2013.01); *B60L 2200/26* (2013.01); *B61F 5/10* (2013.01)

(58) Field of Classification Search
CPC .......... B60L 13/00; B60L 13/04; B60L 13/06; B60L 13/08; B60L 13/10; B60L 2200/26;
(Continued)

(56) References Cited

U.S. PATENT DOCUMENTS

2020/0164751 A1*   5/2020   Zhang ...................... B61F 5/52

FOREIGN PATENT DOCUMENTS

| CN | 1857952 A | 11/2006 |
|---|---|---|
| CN | 101062662 A | 10/2007 |

(Continued)

OTHER PUBLICATIONS

Supplementary European Search Report in the European application No. 18935863.3, mailed on Nov. 4, 2021.
(Continued)

*Primary Examiner* — Zachary L Kuhfuss
*Assistant Examiner* — Heaven R Buffington
(74) *Attorney, Agent, or Firm* — Syncoda LLC; Feng Ma

(57) ABSTRACT

A maglev vehicle and a suspension frame assembly thereof. The suspension frame assembly includes multiple suspension frames sequentially connected to each other. Each suspension frame comprises two motor beams, four support arms, and four air springs. An air spring mounting seat is disposed at a top portion of each support arm. The air spring mounting seats are cavities having openings. The air springs are accommodated in the respective cavities.

19 Claims, 9 Drawing Sheets

(51) Int. Cl.
*B60L 13/08* (2006.01)
*B61F 5/14* (2006.01)
*B61F 5/10* (2006.01)

(58) Field of Classification Search
CPC . B61B 13/00; B61B 13/08; B61F 5/10; B61F 5/144; B61F 5/24; B61F 5/30
USPC .......................................................... 104/281
See application file for complete search history.

(56) References Cited

FOREIGN PATENT DOCUMENTS

| CN | 101101030 | A | | 1/2008 |
|---|---|---|---|---|
| CN | 201046707 | Y | | 4/2008 |
| CN | 201901013 | U | | 7/2011 |
| CN | 102352906 | A | | 2/2012 |
| CN | 202170953 | U | | 3/2012 |
| CN | 102991519 | A | | 3/2013 |
| CN | 203766544 | U | | 8/2014 |
| CN | 102963266 | B | * | 2/2015 |
| CN | 105904995 | A | | 8/2016 |
| CN | 106740252 | A | | 5/2017 |
| CN | 206416877 | U | | 8/2017 |
| CN | 107599888 | A | | 1/2018 |
| CN | 206856720 | U | | 1/2018 |
| JP | 2007182110 | A | | 7/2007 |

OTHER PUBLICATIONS

International Search Report in the international application No. PCT/CN2018/113493, mailed on May 30, 2019.
English translation of the Written Opinion of the International Search Authority in the international application No. PCT/CN2018/113493, mailed on May 30, 2019.
Author: Gao, Liang et al., Track project, On p. 310, 4 pieces of part function, China railway press, Aug. 2015.

* cited by examiner

MAGLEV VEHICLE AND SUSPENSION FRAME ASSEMBLY THEREOF

CROSS-REFERENCE TO RELATED APPLICATIONS

The present application is a national stage of International Application No. PCT/CN 2018/113493 filed on Nov. 1, 2018, which claims priority to Chinese Patent Application No. 201811157992.3, filed on Sep. 30, 2018. The disclosures of these applications are hereby incorporated by reference in their entirety.

TECHNICAL FIELD

The present disclosure relates to the technical field of rail vehicles, and particularly to a maglev vehicle and a suspension frame assembly for the maglev vehicle.

BACKGROUND

With the continuous rise of subway, subway lines are being built all over our country. However, conventional wheel-rail subways have a high requirement for foundation, and a route on a road surface has a problem of large noise. In addition, the construction of the ground routes in cities is limited by buildings and topography, and it is difficult to achieve a route with large climbing capacity and small curve radius. Therefore, a medium-low speed maglev train, as a new type of rail vehicle, is more and more popular in cities, and has the advantages of a low noise, strong acceleration and braking abilities, a strong climbing ability, a small turning radius, a small vibration, and a good comfort.

As one of important components of a maglev vehicle, a suspension frame assembly affects an operation performance of the maglev vehicle. The associated suspension frame assembly includes a plurality of suspension frames sequentially connected to each other. Each of the suspension frames is fixedly provided with a corbel at each of both ends of a longitudinal beam body. The corbel is mounted with an air spring corbel beam for mounting an air spring, and an air spring mounting seat is provided on the air spring corbel beam. Since the air spring is mounted above the corbel, an airbag of the air spring is exposed to the air, an air spring dustproof cover needs to be provided to protect the air spring, which results in problems that the suspension frame is large in weight, high in center of gravity, and needs to be provided with the dustproof cover.

SUMMARY

Embodiments of the present disclosure provide a maglev vehicle and a suspension frame assembly for the maglev vehicle. The suspension frame assembly uses a cavity provided on a corbel as an air spring mounting seat, so that an air spring is disposed inside the corbel. The suspension frame assembly not only eliminates an air spring dustproof cover, a transverse pull rod, and an air spring corbel beam, but also lowers a level of a top surface of the air spring, thereby solving problems that the associated suspension frame is large in weight, high in center of gravity, and needs to be provided with the air spring dust proof cover.

A first aspect of embodiments of the present disclosure provides a suspension frame assembly for a maglev vehicle, the suspension frame assembly includes a plurality of suspension frames sequentially connected to each other; each of the suspension frames includes two motor beams, four corbels, and four air springs.

The two motor beams are arranged in parallel.

Each of both ends of each of the motor beams is fixedly connected with one of the corbels.

Each of the corbels is provided with an air spring mounting seat at a top of each of the corbels, the air spring mounting seat is a cavity having an opening.

Each cavity accommodates one of the air springs.

In some alternative embodiments, the corbel is provided with a motor beam mounting seat for mounting the motor beam on a side surface of the corbel facing toward the motor beam, the motor beam mounting seat includes a positioning flange and a plurality of threaded holes provided around an outer peripheral of the positioning flange.

Each of the both end surfaces of the motor beam is provided with a positioning groove corresponding to the positioning flange and inserted into and matched with the positioning flange, and motor beam through holes corresponding to the threaded holes one to one.

When the corbel is fixedly connected to the motor beam, the positioning flange is inserted into and matched with the positioning groove, and fasteners passing through the motor beam through holes are screw-fitted with the corresponding threaded holes.

In some alternative embodiments, each of the suspension frames may further include two anti-roll beam devices mounted in parallel between the corbels.

One of the anti-roll beam devices is mounted at an end of the motor beam, and the other one of the anti-roll beam devices is mounted at an another end of the motor beam.

In some alternative embodiments, each of the anti-roll beam devices includes a first anti-roll beam and a second anti-roll beam opposite to each other and hinged to each other.

The first anti-roll beam and the second anti-roll beam are movably connected to each other by two suspenders, and an end of the first anti-roll beam away from the second anti-roll beam and an end of the second anti-roll beam away from the first anti-roll beam each are hinged with the corresponding corbel.

In some alternative embodiments, the first anti-roll beam and the second anti-roll beam each include two fixedly connected anti-roll beam plates arranged in parallel.

In some alternative embodiments, each of the suspension frames may further include comprehensive brackets corresponding to the corbels one to one and fixedly connected to the corbels.

Each of the comprehensive brackets is provided with an anti-rolling beam mounting seat, and the anti-roll beam mounting seat is hinged to an end of the first anti-roll beam or an end of the second anti-roll beam.

In some alternative embodiments, at least two threaded holes of the plurality of threaded holes are positioned on a side close to the anti-roll beam device, the comprehensive bracket is provided with fixing through holes corresponding to the at least two threaded holes one to one, the fasteners sequentially pass through the fixing through holes and the motor beam through holes and then are screw-fitted with the corresponding threaded holes, to fixedly connect the comprehensive bracket, the motor beam, and the corbel together.

In some alternative embodiments, the suspension frame may further include hydraulic support wheels for supporting the suspension frame and rolling on a track.

Each of the hydraulic support wheels includes a hydraulic device mounted on each of the comprehensive brackets, and a support wheel corresponding to the hydraulic device and mounted at a bottom of the hydraulic device.

In some alternative embodiments, each of the comprehensive brackets is provided with two through holes having axes extending in a vertical direction, and each of through holes is mounted with the hydraulic device.

In some alternative embodiments, the motor beams are hollow beams having cavities, and bottom surfaces of the motor beams are provided with linear motor mounting seats.

In some alternative embodiments, the suspension frame may further include linear motors fixedly connected to the linear motor mounting seats for providing traction.

In some alternative embodiments, the suspension frame may further include a motor protection wheel mounted at a bottom of each of the corbels and the motor protection wheel is configured so that the maglev vehicle contacts the track during an emergency landing to protect the linear motor.

In some alternative embodiments, the corbels are, at bottoms of side surfaces of the corbels facing toward the motor beams, provided with suspension electromagnet mounting seats extending toward the motor beams.

The suspension frame may further include suspension electromagnets fixedly mounted on the suspension electromagnet mounting seats and configured for providing suspension force.

In some alternative embodiments, the suspension frame may further include brake devices.

The brake devices include brake clamps mounted on the suspension electromagnets.

In some alternative embodiments, the suspension frame may further include skid devices for supporting the suspension frame during a landing and/or for performing a brake operation during an emergency landing.

The corbels are provided with skid device mounting seats at bottoms of surfaces of the corbels facing toward inside of the suspension frame.

The skid devices are fixedly mounted on the skid device mounting seats.

In some alternative embodiments, the skid device mounting seats are fixed blocks protruding from bottoms and side surfaces of the corbels, and limiting rims for limiting the skid devices in a vertical direction are provided at tops of the skid device mounting seats.

In some alternative embodiments, the suspension frame may further include a sliding table fixedly connected to a top of each of the air springs.

A second aspect of embodiments of the present disclosure provides a maglev vehicle including the suspension frame assembly in any one of the above-described technical solutions.

According to the maglev vehicle and the suspension frame assembly for the maglev vehicle provided in the embodiments of the present disclosure, the suspension frame assembly uses the cavity having the opening as the air spring mounting seat, the air spring is mounted in the cavity of the corbel, and the air spring is positioned in the cavity of the corbel by a cover of a sliding table. Meanwhile, a displacement of the air spring in a horizontal direction can be limited by a cooperation of the air spring and a cavity wall of the cavity. The suspension frame assembly can not only eliminate the air spring dustproof cover, the transverse pull rod, and the air spring corbel beam used in the related art, but also lower the level of the air spring, thereby reducing the center of gravity of the suspension frame assembly, and improving the operation stability of the maglev vehicle provided with the suspension frame assembly. Therefore, the above-mentioned magnetic suspension assembly has the advantages of being small in weight, low in center of gravity, and unnecessary to provide the air spring dustproof cover, thereby solving the problems that each of the associated suspension frame is large in weight, high in center of gravity, and needs to be provided with the dustproof cover.

BRIEF DESCRIPTION OF THE DRAWINGS

The accompanying drawings illustrated herein are used to provide a further understanding of the present disclosure, which constitute a part of the present disclosure, and the illustrative embodiments of the present disclosure and the description thereof are used to explain the present disclosure, but do not constitute an improper limitation of the present disclosure. In the accompanying drawings.

LIST OF REFERENCE NUMERALS

1: suspension frame; 2: track; 11: motor beam; 12: corbel; 13: air spring; 14: sliding table; 15: fastener; 16: anti-roll beam device; 17: comprehensive bracket; 18: hydraulic support wheel; 19: linear motor; 20: motor protection wheel; 21: suspension electromagnet; 22: brake device; 23: skid device;

111: first motor beam; 112: second motor beam; 113: positioning groove; 114:

motor beam through hole; 121: first corbel; 122: second corbel; 123: third corbel; 124: fourth corbel; 125: air spring mounting seat; 126: suspension electromagnet mounting seat; 127: skid device mounting seat; 128: motor beam mounting seat; 161: first anti-roll beam; 162: second anti-roll beam; 163: suspender; 171: anti-roll beam mounting seat; 172: fixing through hole; 173: through hole; 181: hydraulic device; 182: support wheel;

1271: limiting rim; 1281: positioning flange; 1282: threaded hole; 1611: first anti-roll beam plate; 1612: second anti-roll beam plate; and 1711: hinge hole.

DETAILED DESCRIPTION

In carrying out the present disclosure, it has been found by the skilled person that air springs of a suspension frame are mounted above corbels, an airbag of each of the air springs is exposed to the air, and an air spring dustproof cover needs to be provided to protect each of the air springs, which results in problems that the suspension frame is large in weight, high in center of gravity, and needs to be provided with the dustproof cover.

In view of the above problems, embodiments of the present disclosure provide a maglev vehicle and a suspension frame assembly for a maglev vehicle, the suspension frame assembly allows an air spring to be mounted in a cavity at the top of a corbel so as to eliminate the air spring dustproof cover, the transverse pull rod, and the air spring corbel beam used in the related art. Therefore, the above-mentioned magnetic suspension assembly has the advantages of being small in weight, low in center of gravity, and unnecessary to provide an air spring dustproof cover.

In order to make the technical solutions and advantages of the embodiments of the present disclosure clearer, the exemplary embodiments of the disclosure will be further described in detail below with reference to the accompanying drawings. Apparently, the described embodiments are merely a part of the embodiments of the present disclosure, rather than an exhaustive list of all the embodiments. It should be noted that the embodiments in the present disclosure and the features in the embodiments can be combined with each other in the case of no conflict.

Figure 1:
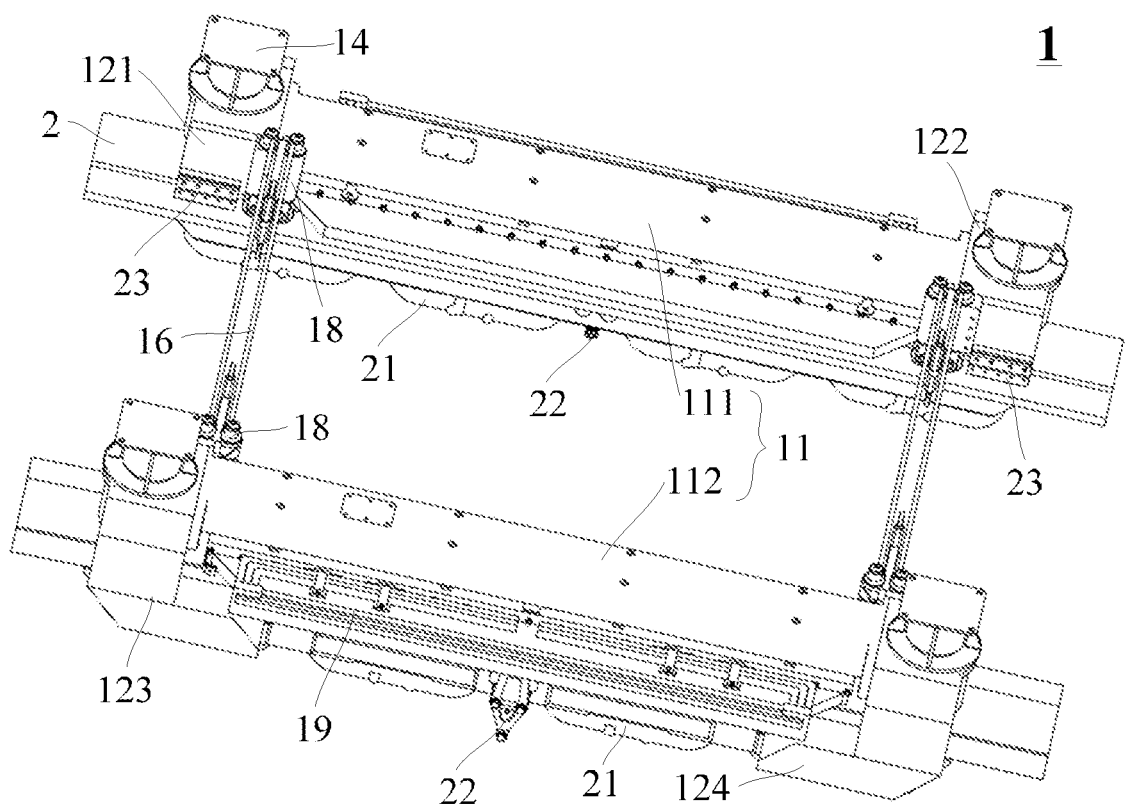
FIG. 1 is a schematic structural view showing a suspension frame assembly provided by an embodiment of the present disclosure.
Figure 2:
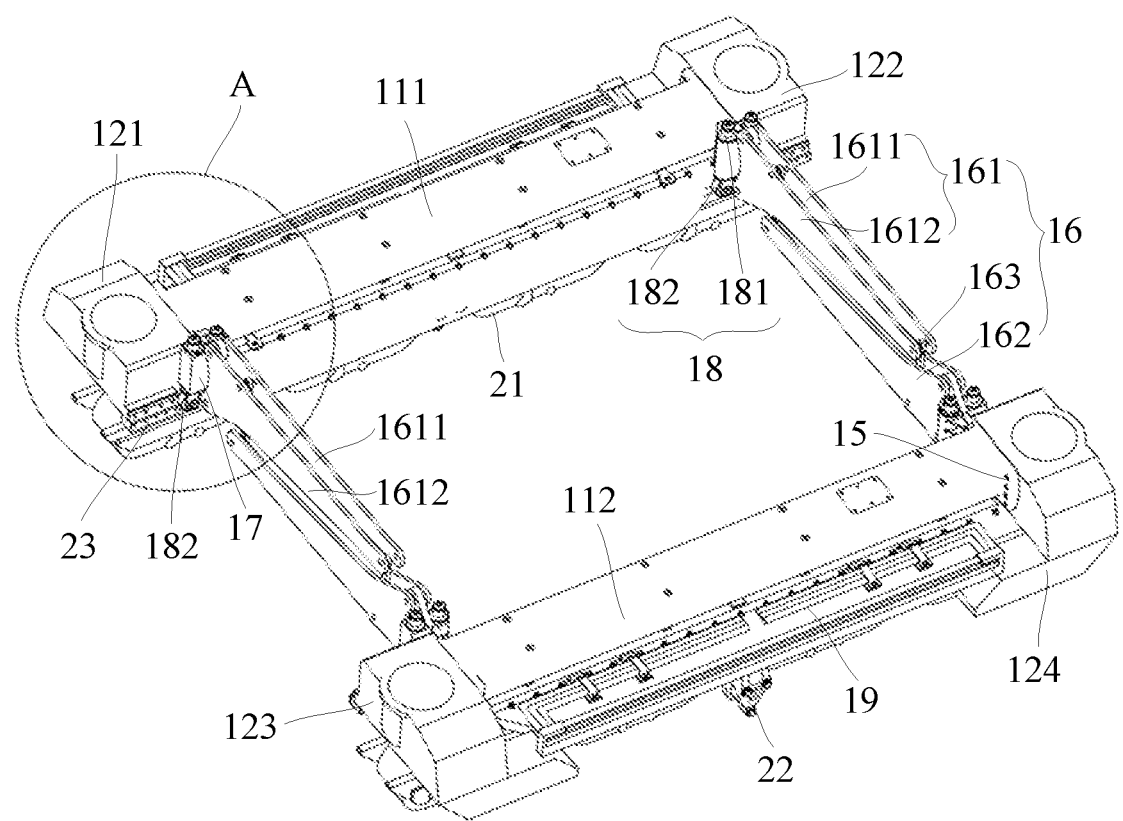
FIG. 2 is a schematic structural view showing the suspension frame assembly of FIG. 1, in which sliding tables and air springs are not mounted.

A first aspect of embodiments of the present disclosure provides a suspension frame assembly for a maglev vehicle. As shown in FIG. 1 and FIG. 2, the suspension frame assembly includes a plurality of suspension frames 1 sequentially connected to each other. Each of the suspension frames 1 includes two motor beams 11, four corbels 12 and four air springs 13.

The two motor beams 11 are arranged in parallel. The motor beams 11 as shown in the structure of FIG. 1 may include a first motor beam 111 and a second motor beam 112 arranged in parallel, and a specific structure of the first motor beam 111 may be referred to FIG. 4. A length extension direction of the first motor beam 111 and a length extension direction of the second motor beam 112 coincide with an extension direction of a track 2, the first motor beam 111 and the second motor beam 112 are arranged opposite to each other, and the first motor beam 111 and the second motor beam 112 are arranged in a direction perpendicular to the extension direction of the track 2.

Each of both ends of each of the motor beams 11 is fixedly connected with one of the corbel 12. As shown in the structure of FIG. 2, both ends of the first motor beam 111 are fixedly connected with a first corbel 121 and a second corbel 122 respectively, and both ends of the second motor beam 112 are fixedly connected with a third corbel 123 and a fourth corbel 124 respectively.

Figure 3:
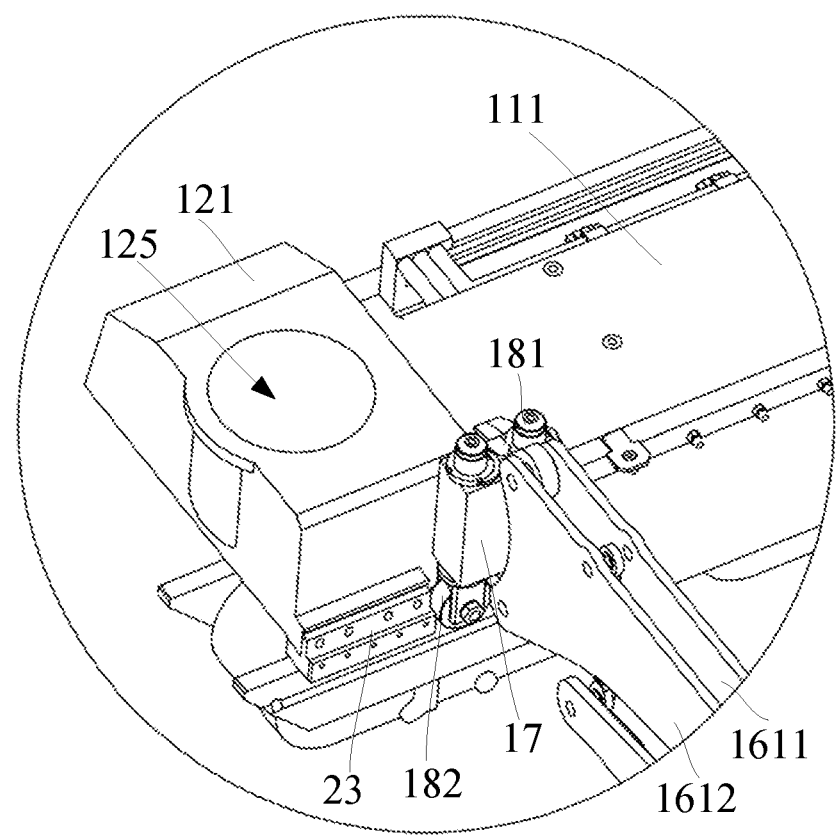
FIG. 3 is a partially enlarged schematic view of a portion A of the suspension frame assembly of FIG. 2.

Each of the corbels 12 is provided with an air spring mounting seat 125 at a top of each of the corbels, and the air spring mounting seat 125 is a cavity having an opening. As shown in the structures of FIG. 2 and FIG. 3, the first corbel 121 is provided with a cavity having an opening at a top of the first corbel, the second corbel 122 is provided with a cavity having an opening at a top of the second corbel, the third corbel 123 is provided with a cavity having an opening at a top of the third corbel, and the fourth corbel 124 is provided with a cavity having an opening at a top of the fourth corbel.

Figure 6:
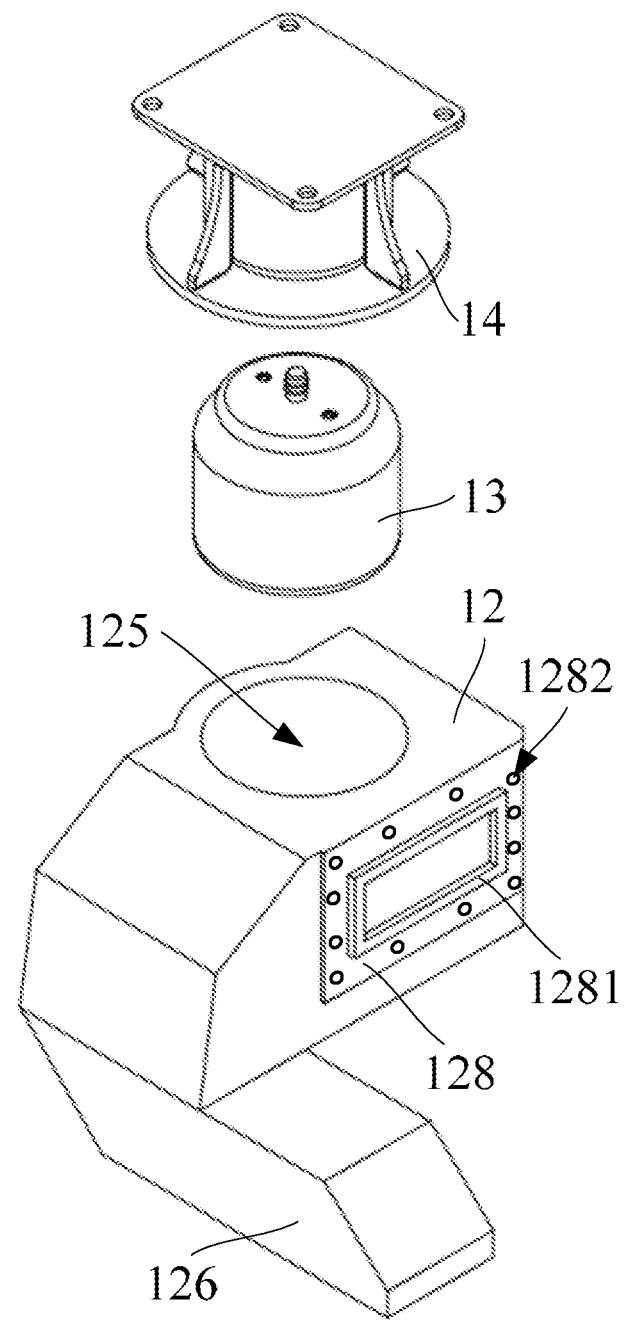
FIG. 6 is a schematic structural view showing the air spring, the sliding table and the corbel of FIG. 5 disassembled from each other.

Each of the cavities accommodates one of the air springs 13. As shown in the structure of FIG. 6, each of the cavities of the corbels 12 accommodates one of the air springs 13, and each of the air springs 13 is mounted with a sliding table 14 at a top of the each of the air springs. The maglev vehicle is carried and suspended by the air springs 13 and the sliding tables 14.

Each of the corbels 12 of the above-mentioned suspension frame is provided with a cavity having an opening at the top of the each of the corbels, the cavity is used as the air spring mounting seat 125 so that the air spring 13 may be mounted inside the cavity of the corbel 12. When the sliding table 14 is mounted on the air spring 13, an airbag of the air spring 13 is completely located in the air spring mounting seat 125 in an non-working state, and most of the air spring 13 is located in the air spring mounting seat 125 in a working state, and the airbag can be attached to a cavity wall of the cavity to protect the airbag and ensure a transverse stability during an operation of the maglev vehicle. Since the airbag of the air spring 13 is located in the cavity, it is possible to eliminate the air spring dustproof cover sealing the air spring 13 in the related art, the transverse pull rod limiting the air spring 13 in the transverse direction and the air spring corbel beam. By eliminating the air spring dustproof cover, the transverse pull rod and the air spring corbel beam, the number and weight of parts of the suspension frame assembly can be reduced. Since the air spring 13 is mounted inside the corbel 12, the level of the air spring 13 can be lowered compared with the air spring 13 mounted at the top of the corbel 12 in the related art, thereby reducing the height of the center of gravity of the suspension frame assembly, and improving the operation stability of the maglev vehicle.

Therefore, the above-mentioned magnetic suspension assembly has the advantages of being small in weight, low in center of gravity, and unnecessary to provide an air spring dustproof cover, thereby solving the problems that the associated suspension frame 1 is large in weight, high in center of gravity, and needs to be provided with the dustproof cover.

Figure 4:
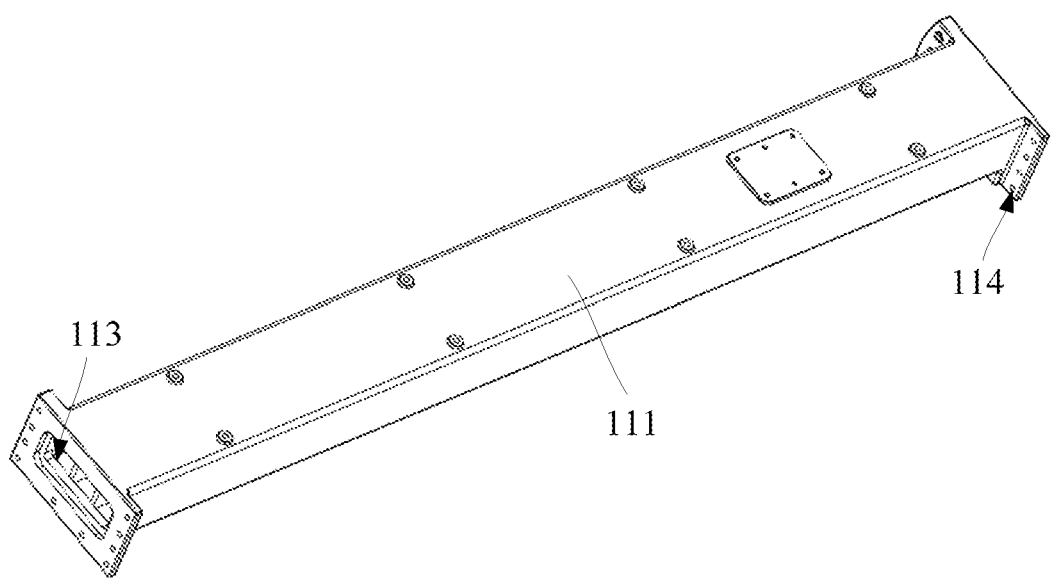
FIG. 4 is a schematic structural view showing a motor beam of the suspension frame assembly of FIG. 1.
Figure 5:
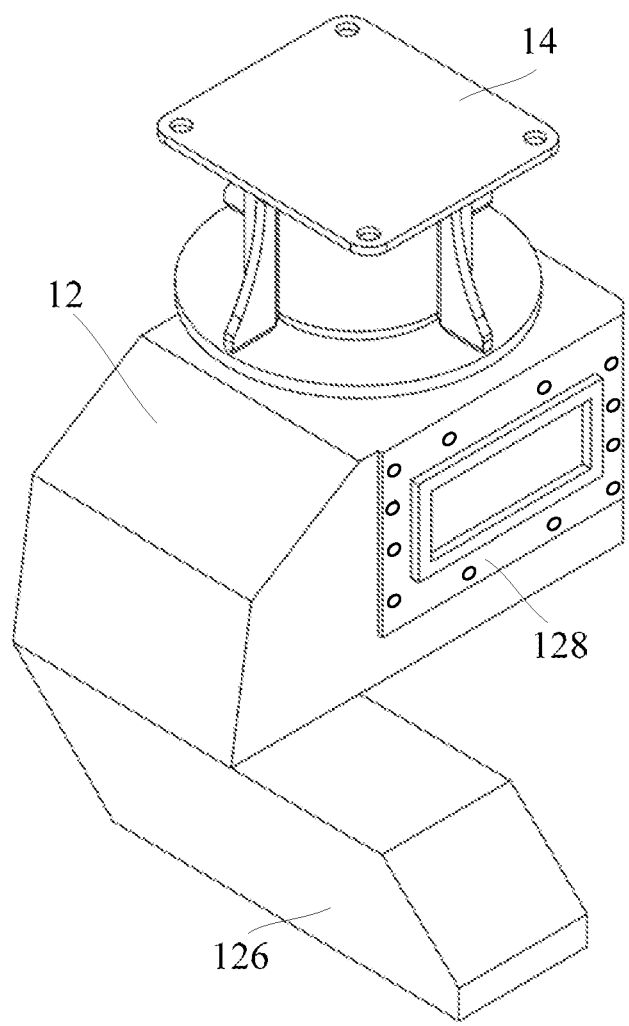
FIG. 5 is a schematic structural view showing the air spring, the sliding table and the corbel of FIG. 1 assembled together.
Figure 7:
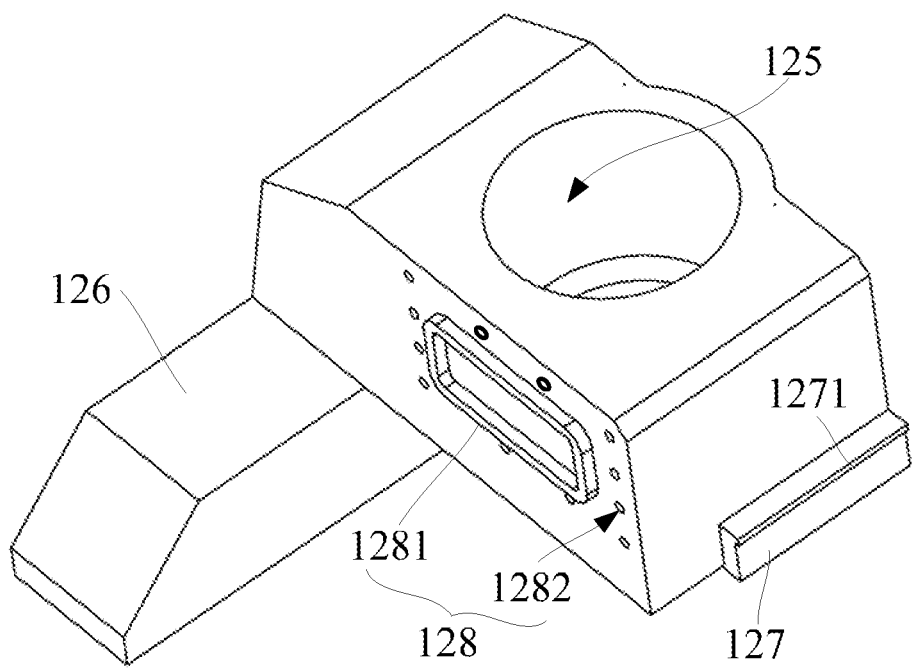
FIG. 7 is a schematic structural view showing one side of the corbel of FIG. 1.
Figure 8:
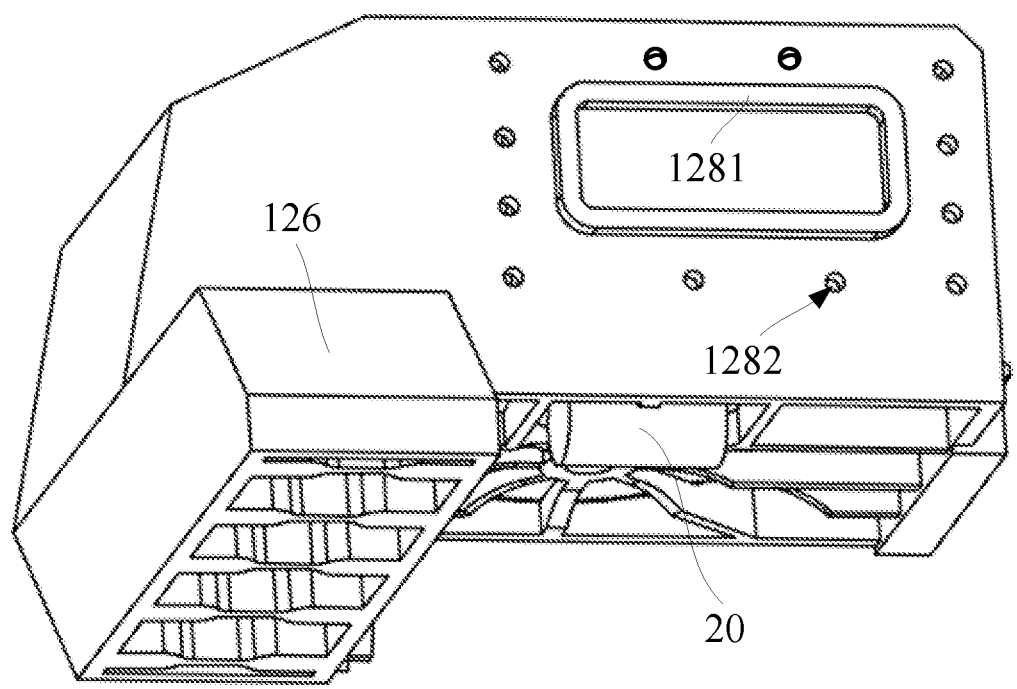
FIG. 8 is a schematic structural view showing an another side of the corbel of FIG. 7.
Figure 9:
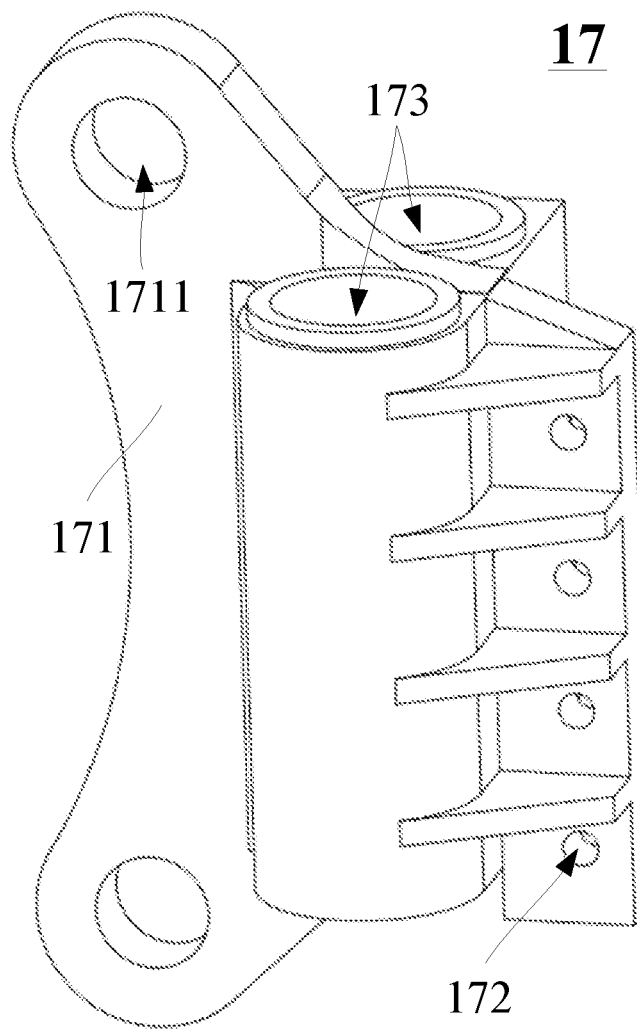
FIG. 9 is a schematic structural view showing a comprehensive bracket of the suspension frame assembly of FIG. 1.

In a specific embodiment, as shown in the structures of FIG. 4, FIG. 5 and FIG. 8, each of the corbels 12 is provided with a motor beam mounting seat 128 for mounting the motor beam 11 on a side surface of the corbel facing toward the motor beam 11, the motor beam mounting seat 128 includes a positioning flange 1281 and a plurality of threaded holes 1282 provided around an outer peripheral of the positioning flange 1281. As shown in the structures of FIG. 5 and FIG. 6, the positioning flange 1281 is a rectangular ring structure. The positioning flange 1281 may also be provided with rounded corners, as shown in the structures of FIG. 7 and FIG. 8. The plurality of threaded holes 1282 may be uniformly distributed around the outer periphery of the positioning flange 1281, or the positions of the threaded holes 1282 may be arranged at random, or may be specifically arranged according to actual requirements.

As shown in the structure of FIG. 4, each of the both end surfaces of the motor beam 11 is provided with a positioning groove 113 corresponding to the positioning flange 1281 and inserted into and matched with the positioning flange, and motor beam through holes 114 corresponding to the threaded holes 1282 one to one.

When the corbel 12 is fixedly connected to the motor beam 11, the positioning flange 1281 is inserted into and matched with the positioning groove 113, and fasteners 15 passing through the motor beam through holes 114 are screw-fitted with the corresponding threaded holes 1282.

The corbel 12 can be positioned to be connected to the motor beam 11 by inserting the positioning flange 1281 into and matching the positioning flange with the positioning groove 113 between the corbel 12 and the motor beam 11. In this way, the speed of mounting the motor beam 11 with the corbel 12 can be increased, and the connection strength and stability between the corbel 12 and the motor beam 11 can also be improved.

Specifically, as shown in the structures of FIG. 1, FIG. 2, FIG. 3 and FIG. 8, each suspension frame 1 may further include two anti-roll beam devices 16 mounted in parallel between the corbels 12, in which: one of the anti-roll beam devices 16 is mounted at an end of the motor beam 11 and the other one of the anti-roll beam devices 16 is mounted at an another end of the motor beam 11.

The anti-roll beam devices 16 mounted between the corbels 12 can improve the anti-roll performance of the suspension frame assembly, thereby improving the stability and reliability of the suspension frame assembly, and further improving the operation stability and safety of the maglev vehicle.

As shown in the structures of FIG. 2 and FIG. 3, each of the anti-roll beam devices 16 may include a first anti-roll beam 161 and a second anti-roll beam 162 opposite to each other and hinged to each other.

The first anti-roll beam 161 and the second anti-roll beam 162 are movably connected to each other by two suspenders 163, and an end of the first anti-roll beam 161 away from the second anti-roll beam 162 and an end of the second anti-roll beam 162 away from the first anti-roll beam 161 each are hinged with the corresponding corbel 12.

As shown in the structures of FIG. 2 and FIG. 3, the first anti-roll beam 161 and the second anti-roll beam 162 each include two fixedly connected anti-roll beam plates arranged in parallel, and the two anti-roll beam plates may be a first anti-roll beam plate 1611 and a second anti-roll beam plate 1612 arranged in parallel and riveted to each other.

As shown in the structure of FIG. 8, each of the suspension frames 1 further includes comprehensive brackets 17 corresponding to the corbels 12 one to one and fixedly connected to the corbels 12. Each of the comprehensive brackets 17 is provided with an anti-roll beam mounting seat 171, and the anti-roll beam mounting seat 171 is hinged to an end of the first anti-roll beam 161 or an end of the second anti-roll beam 162. As shown in the structure of the FIG. 8, the comprehensive bracket 17 is provided with an arc-shaped plate extending away from the corbel 12, and the arc-shaped plate forms the anti-roll beam mounting seat 171. The arc-shaped plate is provided with two hinge holes 1711 arranged at a top and a bottom of the arc-shaped plate respectively, and both the first anti-roll beam plate 1611 and the second anti-roll beam plate 1612 are provided with mounting holes corresponding to the hinge holes 1711, so that the hinge joint is realized by pin shafts passing through the corresponding mounting holes and the hinge holes 1711.

As shown in the structures of FIG. 3, FIG. 5, and FIG. 8, at least two threaded holes 1282, which may be two, three, four, or more threaded holes 1282, of the plurality of threaded holes for mounting the motor beam 11 are positioned on a side close to the anti-roll beam device 16. The comprehensive bracket 17 is provided with fixing through holes 172 corresponding to the at least two threaded holes 1282 one to one. As shown in the structure of FIG. 8, the comprehensive bracket 17 is provided with four fixing through holes 172, the four fasteners 15 sequentially pass through the fixing through holes 172 and the motor beam through holes 114 and then are screw-fitted with the corresponding threaded holes 1282, to fixedly connect the comprehensive bracket 17, the motor beam 11, and the corbel 12 together.

The comprehensive bracket 17 and the motor beam 11 are fixed by means of the same threaded holes 1282 on the corbel 12, so that the comprehensive bracket 17 and the motor beam 11 can be mounted to the corbel 12 by the fasteners 15, which not only lessens the mounting process, saves the mounting time, but also reduces the number of the fasteners 15, thereby reducing the cost while reducing the weight of the suspension frame 1.

As shown in the structures of FIG. 2 and FIG. 3, the suspension frame 1 further includes hydraulic support wheels 18 supporting the suspension frame 1 and rolling on a track 2. The hydraulic support wheel 18 includes a hydraulic device 181 mounted on each of the comprehensive brackets 17, and a support wheel 182 corresponding to the hydraulic device 181 and mounted at a bottom of the hydraulic device 181. The comprehensive bracket 17 corresponding to each of the corbels 12 is mounted with two hydraulic support wheels 18, and therefore each of the suspension frame assemblies is provided with a total of eight hydraulic support wheels 18.

In order to reduce the number of parts, each of the comprehensive brackets 17 is provided with two through holes 173 having axes extending in a vertical direction, and each of the through holes 173 is mounted with one hydraulic device 181, as shown in the structure of FIG. 8.

In order to reduce the overall weight of the suspension frame 1, the motor beams 11 may be hollow beams having cavities, and bottom surfaces of the motor beams 11 are provided with linear motor mounting seats (not shown). The suspension frame 1 further includes linear motors 19 fixedly connected to the linear motor mounting seats, and the linear motors 19 are configured for providing traction for the maglev vehicle.

As shown in the structures of FIG. 2 and FIG. 6, the corbels 12 are, at bottoms of side surfaces of the corbels facing toward the motor beams 11, provided with suspension electromagnet mounting seats 126 extending toward the motor beams 11, and the suspension electromagnet mounting seats 126 are configured for mounting suspension electromagnets 21. The suspension frame 1 further includes suspension electromagnets 21 fixedly mounted on the suspension electromagnet mounting seats 126 and configured for providing suspension force. The suspension electromagnets 21 provide the suspension force for the suspension frame assembly, so that the suspension frame assembly is suspended on the track 2.

In order to prevent the maglev vehicle from damaging the linear motor 19 during an emergency landing, the suspension frame 1 may further include a motor protection wheel 20 mounted at a bottom of each of the corbels 12, as shown in the structure of FIG. 8. The motor protection wheel 20 is configured so that the maglev vehicle contacts the track 2 during the emergency landing to protect the linear motor 19.

As shown in the structures of FIG. 1 and FIG. 2, the suspension frame 1 further includes a brake device 22. The brake device 22 may include a brake clamp mounted on the suspension electromagnet 21, and may further include a hydraulic cylinder or a pneumatic cylinder for supplying a brake force to the brake clamp, and a pipeline for communicating the hydraulic cylinder or the pneumatic cylinder with the brake clamp.

In order to improve the safety of the maglev vehicle, as shown in the structures of FIG. 1, FIG. 2 and FIG. 3, the suspension frame 1 may further include skid devices 23 for supporting the suspension frame 1 during a landing and/or for performing a brake operation during an emergency landing. As shown in structure of FIG. 7, the corbels 12 are provided with skid device mounting seats 127 at bottoms of surfaces of the corbels facing toward inside of the suspension frame 1. The skid devices 23 are fixedly mounted on the skid device mounting seats 127. The skid device mounting seats 127 are fixed blocks protruding from the bottoms and the side surfaces of the corbels 12. Limiting rims 1271 for limiting the skid devices 23 in a vertical direction are provided at tops of the skid device mounting seats 127.

As shown in the structure of FIG. 1, the suspension frame 1 further includes a sliding table 14 fixedly connected to a top of each of the air springs 13. A vehicle body of the maglev vehicle is supported by the sliding table 14, so that the suspension frame assembly is fixedly connected to the vehicle body, and the vehicle body moves along the track 2 under the drive of the suspension frame assembly.

A second aspect of embodiments of the present disclosure provides a maglev vehicle including the suspension frame assembly in any one of the above embodiments.

In the case that the maglev vehicle uses the above mentioned suspension frame assembly, since the suspension frame assembly eliminates the air spring dustproof cover, the transverse pull rod, and the air spring corbel beam, the weight and the number of the parts of the maglev vehicle can be reduced, and thus the energy consumption and the cost of the maglev vehicle can further be reduced.

Although some alternative embodiments of the present disclosure have been described, those skilled in the art can make additional changes and modifications to these embodiments once they learn the basic creative concept. Therefore, the claims are intended to be interpreted as including some alternative embodiments and all changes and modifications within the scope of the present disclosure.

Obviously, those skilled in the art can make various modifications and variations to this disclosure without departing from the spirit and scope of the present disclosure. In this way, if these modifications and variations of the present disclosure fall into the scope of the claims of the present disclosure and their equivalent technologies, the present disclosure is also intended to include these modifications and variations.

What is claimed is:

1. A suspension frame assembly for a maglev vehicle, comprising a plurality of suspension frames sequentially connected to each other;
   each of the suspension frames comprising two motor beams, four corbels, and four air springs;
   the two motor beams being arranged in parallel;
   each of both ends of each of the motor beams being fixedly connected with one of the corbels;
   each of the corbels being provided with an air spring mounting seat at a top of each of the corbels, the air spring mounting seat being a cavity having an opening; and
   each cavity accommodating one of the air springs,
   wherein an airbag of each of the air springs is completely located in the air spring mounting seat in a non-working state, each of the air springs is not completely located in the air spring mounting seat in a working state, and the airbag is configured to be attached to a cavity wall of the cavity.

2. The suspension frame assembly according to claim 1, wherein the corbel is provided with a motor beam mounting seat for mounting the motor beam on a side surface of the corbel facing toward the motor beam, the motor beam mounting seat comprising a positioning flange and a plurality of threaded holes provided around an outer peripheral of the positioning flange;
   each of both end surfaces of the motor beam being provided with a positioning groove corresponding to the positioning flange and inserted into and matched with the positioning flange, and motor beam through holes corresponding to the threaded holes one to one; when the corbel is fixedly connected to the motor beam, the positioning flange is inserted into and matched with the positioning groove, and fasteners passing through the motor beam through holes are screw-fitted with the corresponding threaded holes.

3. The suspension frame assembly according to claim 2, wherein each of the suspension frames further comprises two anti-roll beam devices mounted in parallel between the corbels, and wherein,
   one of the anti-roll beam devices is mounted at an end of the motor beam, and the other one of the anti-roll beam devices is mounted at an another end of the motor beam.

4. The suspension frame assembly according to claim 3, wherein each of the anti-roll beam devices comprises a first anti-roll beam and a second anti-roll beam opposite to each other and hinged to each other, and wherein:
   the first anti-roll beam and the second anti-roll beam are movably connected to each other by two suspenders, and an end of the first anti-roll beam away from the second anti-roll beam and an end of the second anti-roll beam away from the first anti-roll beam each are hinged with the corresponding corbel.

5. The suspension frame assembly according to claim 4, wherein the first anti-roll beam and the second anti-roll beam each comprise two fixedly connected anti-roll beam plates arranged in parallel.

6. The suspension frame assembly according to claim 4, wherein each of the suspension frames further comprises comprehensive brackets corresponding to the corbels one to one and fixedly connected to the corbels;
   each of the comprehensive brackets being provided with an anti-roll beam mounting seat, and the anti-roll beam mounting seat being hinged to an end of the first anti-roll beam or an end of the second anti-roll beam.

7. The suspension frame assembly according to claim 6, wherein at least two threaded holes of the plurality of threaded holes are positioned on a side close to the anti-roll beam device, the comprehensive bracket being provided with fixing through holes corresponding to the at least two threaded holes one to one, the fasteners sequentially passing through the fixing through holes and the motor beam through holes and then being screw-fitted with the corresponding threaded holes, to fixedly connect the comprehensive bracket, the motor beam and the corbel together.

8. The suspension frame assembly according to claim 6, wherein the suspension frame further comprises hydraulic support wheels for supporting the suspension frame and rolling on a track;
   each of the hydraulic support wheels comprising a hydraulic device mounted on each of the comprehensive brackets, and a support wheel corresponding to the hydraulic device and mounted at a bottom of the hydraulic device.

9. The suspension frame assembly according to claim 8, wherein each of the comprehensive brackets is provided with two through holes having axes extending in a vertical direction, each of the through holes being mounted with the hydraulic device.

10. The suspension frame assembly according to claim 1, wherein the motor beams are hollow beams having cavities, bottom surfaces of the motor beams being provided with linear motor mounting seats.

11. The suspension frame assembly according to claim 10, wherein the suspension frame further comprises linear motors fixedly connected to the linear motor mounting seats for providing traction.

12. The suspension frame assembly according to claim 10, wherein the suspension frame further comprises a motor protection wheel mounted at a bottom of each of the corbels, the motor protection wheel being configured so that the maglev vehicle contacts the track during an emergency landing to protect the linear motor.

13. The suspension frame assembly according to claim 1, wherein the corbels are, at bottoms of side surfaces of the corbels facing towards the motor beams, provided with suspension electromagnet mounting seats extending toward the motor beams;
the suspension frame further comprising suspension electromagnets fixedly mounted on the suspension electromagnet mounting seats and configured for providing suspension force.

14. The suspension frame assembly according to claim 13, wherein the suspension frame further comprises brake devices;
the brake devices comprising brake clamps mounted on the suspension electromagnets.

15. The suspension frame assembly according to claim 1, wherein the suspension frame further comprises skid devices for supporting the suspension frame during a landing and for performing a brake operation during an emergency landing;
the corbels being provided with skid device mounting seats at bottoms of surfaces of the corbels facing toward inside of the suspension frame;
the skid devices being fixedly mounted on the skid device mounting seats.

16. The suspension frame assembly according to claim 15, wherein the skid device mounting seats are fixed blocks protruding from bottoms and side surfaces of the corbels, and limiting rims for limiting the skid devices in a vertical direction are provided at tops of the skid device mounting seats.

17. The suspension frame assembly according to claim 15, wherein the suspension frame further comprises a sliding table fixedly connected to a top of each of the air springs.

18. A maglev vehicle, comprising a suspension frame assembly comprising a plurality of suspension frames sequentially connected to each other; each of the suspension frames comprising two motor beams, four corbels, and four air springs;
the two motor beams being arranged in parallel;
each of both ends of each of the motor beams being fixedly connected with one of the corbels;
each of the corbels being provided with an air spring mounting seat at a top of each of the corbels, the air spring mounting seat being a cavity having an opening; and
each cavity accommodating one of the air springs,
wherein an airbag of each of the air springs is completely located in the air spring mounting seat in a non-working state, each of the air springs is not completely located in the air spring mounting seat in a working state, and the airbag is configured to be attached to a cavity wall of the cavity.

19. The suspension frame assembly according to claim 1, wherein the suspension frame further comprises skid devices for supporting the suspension frame during a landing or for performing a brake operation during an emergency landing;
the corbels being provided with skid device mounting seats at bottoms of surfaces of the corbels facing toward inside of the suspension frame;
the skid devices being fixedly mounted on the skid device mounting seats.

* * * * *